2,938,828
Patented May 31, 1960

2,938,828
OIL-SOLUBLE FUNGICIDES

Mathijs van der Waarden, Berkeley, Calif., and Jacobus J. Tjepkema, The Hague, and Hendrik W. Huyser, Lenze Hartstra, and Gerrit H. Reman, Amsterdam, Netherlands, assignors to Shell Oil Company, a corporation of Delaware No Drawing. Filed Dec. 17, 1956, Ser. No. 628,534

Claims priority, application Netherlands Mar. 29, 1956

20 Claims. (Cl. 167—30)

This invention relates to fungicidally active oil-soluble associates of polyvalent metal oxides with polyvalent metal salts of carbocyclic acids, and to a method for preparing these associates.

We have discovered that fungicidally active oil-soluble associates of polyvalent metal oxides with oil-soluble salts of carbocyclic acids (hereinafter designated by the term "associates") are prepared by reacting an oil-soluble carbocyclic acid compound in a liquid medium comprising a liquid hydrocarbon and a substantial amount of an oxygen-containing organic liquid with a polyvalent metal hydroxide in the form of a finely divided solid in which the particles are near-molecular in size, thereafter removing the said oxygen-containing organic liquid and dehydrating the resulting mixture—that is, converting the metal hydroxide therein to the corresponding metal oxide by removal of water, and removing any free water present. The product is a solution of the associate in the liquid hydrocarbon. We have discovered that the associate is most easily and effectively freed from the liquid hydrocarbon by adding to the solution a liquid which is miscible with the liquid hydrocarbon and which has a dielectric constant of at least 6. The associate precipitates as a solid from the liquid, and when dried is in the form of a fine powder.

We have found that the associates prepared in this way are quite soluble in oil, the resulting solutions being stable, with no decomposition and/or dissolution of the associate. These associates have been found to be very resistant to weathering—much more resistant than other materials commonly used as fungicides. These new associates may contain as many as fifteen or even more atoms of metal as the oxide per atom of metal in the salt of the carbocyclic acid. We have found these associates to be highly active as fungicides, the activity of the metal in these associates (per atom of metal) being at least as great as the activity of the same metal in the metal salt of the carbocyclic acid alone. These new associates thus lend themselves admirably to application as fungicides in the form of low-volume sprays and/or dusts applied from the air. The associates also are of value for use for the protection of wood or fabrics, and may be used in paints for protecting the hulls of boats and ships.

The precise nature of these new associates—the relationship of the metal oxide to the metal salt of the carbocyclic acid—is not known with certainty. However, these associates are represented generically by the formula:

(metal salt of the carbocyclic acid)·x(metal oxide)

or $$(R)_a M \cdot x(M')_{2/b} O$$

wherein R represents the residue—that is, the anionic portion—of an oil-soluble carbocyclic acid, M represents a polyvalent metal atom of valence $a$, M' represents the same metal atom as is represented by M, or a different polyvalent metal atom of valence $b$ and $x$ represents the number of molecules of the metal oxide associated with one molecule of the metal salt of the carbocyclic acid.

In these associates, the metal M may be the same, or different, than the metal M'. Normally, for reasons of convenience in preparation, it is preferred that M and M' represent the same metal. M and M' each represents a polyvalent metal having an atomic number of from 23 through 30, inclusive. The associates in which two or more atoms of metal as the oxide are present per atom of metal in the salt of the carbocyclic acid are preferred as fungicides. Still more preferably, five or more atoms of metal as the oxide are present per atom of metal in the salt.

R represents the residue of any oil-soluble carbocyclic acid. That is, R represents the portion of an oil-soluble carbocyclic acid other than the acidic hydrogen atom of that acid. It is preferred that R represent the residue of a carbocyclic carboxylic acid or a carbocyclic sulfonic acid. The precise nature of the group R will be evident from the description of the process by which the associates of the invention are prepared, described hereinafter in detail.

The associates of the invention are prepared by reacting an oil-soluble carbocyclic acid compound with a polyvalent metal hydroxide in the presence of a liquid hydrocarbon and a substantial amount of an oxygen-containing organic liquid, the polyvalent metal hydroxide being in the form of a finely divided solid in which the particles are near-molecular in size, thereafter removing the oxygen-containing organic liquid and heating the mixture to dehydrate the polyvalent metal hydroxide to the corresponding oxide and removing the water thus formed together with any other water which may be present. Preferably, the polyvalent metal hydroxide is formed from its component ions in situ in the reaction mixture. Thus, the new associates are most effectively prepared by mixing an oil-soluble carbocyclic acid or a salt thereof and a liquid hydrocarbon, together, optionally, with a substantial amount of an oxygen-containing organic liquid, adding a salt of a polyvalent metal preferably in solution containing an oxygen-containing organic liquid and an alkali metal hydroxide preferably in solution containing an oxygen-containing organic liquid, thereafter removing all of the oxygen-containing organic liquid and heating the resulting mixture until evolution of water resulting from dehydration of the polyvalent metal hydroxide to the corresponding oxide plus any other water incidentally present ceases.

In forming the new associates, any carbocyclic acid compound—that is, any carbocyclic acid or salt thereof—which is molecularly or colloidally soluble in a hydrocarbon medium may be used. Thus, any carbocyclic acid or salt thereof which is soluble in such materials as benzene, toluene, xylene, mixtures of xylenes, gasoline fractions, lubricating oil fractions and the like is suitable. The preferred acids are the carbocyclic carboxylic acids and the carbocyclic sulfonic acids.

The carbocyclic carboxylic acids include, for example, the alkyl-substituted aromatic carboxylic acids, including the alkyl-substituted hydroxyaromatic carboxylic acids (salicylic acids), and the cycloaliphatic carboxylic acids, particularly the naphthenic acids.

The alkyl-substituted aromatic carboxylic acids containing at least about 10 carbon atoms in the substituent groups are particularly desirable. Both the mononuclear acids—i.e., those acids which may be considered to have been derived from benzene—and polynuclear acids—those which may be considered to have been derived from naphthalene—are included. Of this class, the most widely available are the alkyl-substituted hydroxyaromatic carboxylic acids—the salicylic acids in which the alkyl group or groups are long-chain in structure and contain a total of at least about 12 carbon atoms. The most desirable class of these salicylic acids comprises those which have been derived from benzene or phenol which has been alkylated with straight-chain hydro-carbons containing from about 8 to about 26, and preferably from about 10 to about 22, carbon atoms. Alkyl-substituted salicylic acids of the kinds prepared by the processes disclosed in copending applications Serial Number 403,445 (filed January 11, 1954), now United States Patent No. 2,807,643, issued September 24, 1957, and Canadian Patent No. 563,180, issued September 9, 1958, are preferred members of this class of oil-soluble carbocyclic carboxylic acids.

The references herein to alkyl salicylic acids are intended to cover the individual acids and also mixtures of acids having different alkyl substituents, for example, a mixture of alkyl salicylic acids having alkyl groups containing from about 10 to about 22 carbon atoms—for example, a mixture of $C_{14}$–$C_{18}$ mono- and di-alkyl salicylic acids. Technical grades of such acids—i.e., mixtures of such acids normally containing some of the corresponding phenates and phenols, will generally be used in practice and in many cases are to be preferred.

Oil-soluble cycloaliphatic carboxylic acids containing at least about 12 carbon atoms also are suitable, examples of this class being the petroleum naphthenic acids, cetyl-cyclohexane carboxylic acids, di-lauryl decahydronaphthalene carboxylic acids, di-octyl-cyclopentane carboxylic acids, and the like. Of particular interest, because of their wide availability at low cost and the high fungicidial activity of the associates prepared therefrom, are the petroleum naphthenic acids, that is, monobasic carboxylic acids of the general formula, RCOOH, wherein R is the naphthenic radical (a radical predominantly derived from cyclopentane or a homolog of cyclopentane). The carboxyl group of the petroleum naphthenic acids normally is attached to a side chain of the naphthenic group, so that the petroleum naphthenic acids normally have the structure:

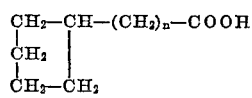

The nature of the petroleum naphthenic acids, as well as suitable individual acids and mixtures of suitable acids, is set out in detail in Kirk-Othmer, "Encyclopedia of Chemical Technology," Interscience Encyclopedia Co., 1952, volume 9, in the section thereof entitled "Naphthenic Acids," pages 241, 247.

The various oil-soluble carbocyclic sulfur acids also are suitable, including the carbocyclic sulfonic acids, sulfamic acids, sulfinic acids, thiosulfonic acids, and the like. These acids can be of either cycloaliphatic or alkyl-substituted aromatic (including both mononuclear and polynuclear aromatic) configuration.

A particularly desirable group of oil-soluble carbocyclic sulfur acids comprises the sulfonic acids of various types, including cycloaliphatic, hydro-aromatic, aromatic (including both benzenesulfonic acids and naphthalene sulfonic acids) and heterocyclic acids, and acids of mixed types. Examples of suitable acids include the sulfonic acids of alkylated aromatic hydrocarbons, such as benzenesulfonic acids, toluene sulfonic acids, naphthalene sulfonic acids, triisopropylnaphthalene sulfonic acids, polyamylnaphthalene sulfonic acids, diphenyl sulfonic acids and the like. Sulfonic acids of aromatic hydrocarbons substituted by a higher alkyl group or groups and in which the alkyl substituent group or groups contain a total of at least about 8, but preferably not more than about 18, carbon atoms, are of particular interest. Sulfonic acids of phenols, which can be monocyclic as well as polycyclic, monohydric as well as polyhydric, and which preferably also contain alkyl and/or aryl substituent groups are also suitable. Examples of this class of acids include the oil-soluble cresol sulfonic acids, xylenol sulfonic acids, naphthol sulfonic acids, catechol sulfonic acids and the like. Sulfonic acids of completely or partly hydrogenated aromatic compounds, for example, tetrahydronaphthalene sulfonic acid, are also suitable. Particularly preferred, however, because of their wide availability, are the petroleum sulfonic acids, particularly the petroleum sulfonic acids which are obtained by sulfonating various hydrocarbon fractions, such as lubricating oil fractions and extracts rich in aromatics which are obtained by extracting a hydrocarbon oil with a selective solvent, which extracts may, if desired, be alkylated before sulfonation by reacting them with olefins or alkyl chlorides by means of an alkylation catalyst; organic polysulfonic acids such as benzene disulfonic acid, which may or may not be alkylated; and the like. The preferred sulfonate starting materials for use in the present invention are those derived from alkylated aromatic sulfonic acids in which the alkyl radical(s) contain at least about 8 carbon atoms, for example, from about 8 to about 22 carbon atoms, exemplary members of this preferred group of sulfonate starting materials being the aliphatic-substituted cyclic sulfonic acids in which the aliphatic substituent(s) contain a total of at least 12 carbon atoms, such as the alkyl aryl sulfonic acids, alkyl cycloaliphatic sulfonic acids and alkyl-heterocyclic sulfonic acids and aliphatic sulfonic acids in which the aliphatic radical(s) contains at least 12 carbon atoms. Specific examples of these oil-soluble sulfonic acids include: petroleum sulfonic acids, petrolatum sulfonic acids, mono- and polywax-substituted naphthalene sulfonic acids, substituted sulfonic acids, such as cetylchlorobenzene sulfonic acids, cetylphenol sulfonic acids, and the like. Aliphatic sulfonic acids, such as paraffin wax sulfonic acids, unsaturated paraffin wax sulfonic acids, hydroxy-substituted paraffin wax sulfonic acids, chlor-substituted wax sulfonic acids, etc.; cycloaliphatic sulfonic acids, such as petroleum naphthalene sulfonic acids, cetyl-cyclopentyl sulfonic acids, mono- and polywax-substituted cyclohexyl sulfonic acids and the like.

The term "petroleum sulfonic acids" is intended to cover all sulfonic acids which are derived directly from petroleum products.

The oil-soluble carbocyclic acid itself may be used in the process of the invention, or a salt of that acid may be used. Where a salt of the acid is used, it is preferred that the salt of a metal be used. The metal salt must be soluble in a liquid hydrocarbon. While the salt of any metal may be used, it is preferred that the metal of the salt be either an alkali metal, or a polyvalent metal having an atomic number of from 23 through 30, inclusive. Where the metal is a polyvalent metal, that metal may be the same as, or it may be different from, the polyvalent metal of the polyvalent metal oxide of the product associate.

The metal salts of these acids may be prepared by directly reacting the acid with a metal base or a metal salt. Alternatively, the polyvalent metal salt may be prepared by first forming the alkali metal salt of the acid, by neutralizing the acid with an alkali metal base, and then converting the alkali metal salt to the polyvalent metal salt by the metathetical reaction of the alkali metal salt with a polyvalent metal salt or base. Methods for preparing the polyvalent metal salts by all of these methods are well known in the art. If desired, the polyvalent metal salt may be prepared in situ in the reaction mixture which is to be used in reacting the polyvalent metal salt of the organic acid with the polyvalent metal hydroxide. In such case, the acid itself, or an alkali metal salt of the acid, is used as the raw material, a polyvalent metal salt being used to convert the acid or the alkali metal salt to the polyvalent metal salt. This aspect of the process of the invention will be described in more detail hereinafter.

In forming the associates of this invention, the carbocyclic acid compound is dissolved in a liquid hydrocarbon, and this solution is reacted with a polyvalent metal hydroxide in the form of solid particles of near-molecular size, a substantial amount of an oxygen-containing organic liquid also being present.

Suitable as the liquid hydrocarbon used as solvent is any hydrocarbon material which is a liquid having a low viscosity at ordinary room temperatures. The hydrocarbon must be a good solvent for the carbocyclic acid and the metal salts of that acid and it must be at least partially (desirably completely) miscible with the oxygen-containing organic liquid used. Such hydrocarbons as benzene, toluene or xylene are quite suitable, as are mixtures of one or more of these compounds. Gasoline fractions, for example, gasoline fractions boiling in the range of from about 60–80° C., or from about 100–150° C., also are quite suitable. Mineral oil fractions generally are suitable, provided their viscosity is not too high. Lubricating oil fractions having a viscosity of from about 100 to about 400 seconds Saybolt Universal at 38° C. are suitable. Liquid hydrocarbons readily fluid at ordinary temperatures and pressures and containing up to 10 carbon atoms per molecule are preferred. It is also preferred that the boiling point of the hydrocarbon used be less than about 250° C., hydrocarbons boiling within the range of from about 60° C. to about 200° C. at atmospheric pressure being most suitable. The amount of the liquid hydrocarbon to be used is determined by the solubility of the carbocyclic acid or salt thereof which is used. Preferably, the acid or salt is completely dissolved in the hydrocarbon liquid, and the solution is readily fluid. Where the acid or salt used is not very soluble in the hydrocarbon liquid used, a readily fluid suspension of the acid or salt in the hydrocarbon liquid may be used; however, such a procedure may cause difficulty in some cases in effecting recovery of the product associate.

Formation of the associate occurs only when the reaction mixture contains a substantial amount of an oxygen-containing organic liquid. Preferably, the liquid used boils below about 140° C. Any non-acidic, i.e., neutral to basic, oxygen-containing organic liquid may be used. Included within this general class are such lesser classes of compounds as the alcohols, ketones, ethers, and esters. It is preferred that the oxygen-containing organic liquid be aliphatic in character, which includes also the cycloaliphatic compounds. Examples of these preferred oxygen-containing compounds are the aliphatic alcohols, the aliphatic ketones, such as methyl ethyl ketone, diethyl ketone, methyl propyl ketone and cyclohexanone; the aliphatic ethers, such as diisopropyl ether, methyl- and ethyl cellusolves, 1,3- and 1,4-dioxanes and the like, and esters of aliphatic carboxylic acids, such as ethyl acetate, ethyl lactate, ethyl propionate, and n- and isopropyl acetates. A preferred class of the oxygen-containing organic liquids comprises the monohydric lower aliphatic alcohols, particularly those containing from 1 to about 6 carbon atoms. Examples of this class include methanol, ethanol, 1- and 2-propanols, n-, sec-, and tert-butyl alcohols, and the various $C_5$- and $C_6$- alcohols, both straight-chain and branched-chain in configuration. It is preferred that the oxygen-containing organic liquid be substantially water-miscible, and complete water-miscibility is desirable, the alkanols containing from 1 to 3 carbon atoms being most desirable.

The amount of oxygen-containing liquid present in the reaction zone is critical with respect to the formation of the associates of the invention. The amount of the oxygen-containing liquid must comprise at least 20% by weight and preferably at least about 50% by weight of the total liquid charged to the reaction zone—i.e., the total of the liquid hydrocarbon plus the oxygen-containing liquid charged. It seldom will be necessary that the amount of oxygen-containing liquid exceed about 80% by weight of the liquid in the reaction mixture.

The associates of the invention are prepared by introducing a polyvalent metal hydroxide in the form of solid particles near-molecular in size into the reaction mixture comprising the carbocyclic acid compound the liquid hydrocarbon and the oxygen-containing organic liquid. Preferably the polyvalent metal hydroxide is formed by bringing the polyvalent metal ion and the hydroxide ion together in the reaction mixture.

As the source of the polyvalent metal ion, there may be used any water-soluble polyvalent metal salt of a strong inorganic acid, such as the polyvalent metal salts of nitric acid, sulfuric acid, the hydrohalic acids and the like. The polyvalent metal salts of hydrohalic acids—i.e., the metal halides—are preferred because of their wide availability and low cost. Mixtures of salts of two or more of these metals may also be used.

The polyvalent metal may be any polyvalent metal having an atomic number of 23 through 30, inclusive—i.e., vanadium, chromium, manganese, iron, cobalt, nickel, copper and zinc. Of this class of polyvalent metals, copper is preferred because of the high level of fungicidal activity exhibited by the associates containing copper.

As the source of the hydroxyl ion for formation of the polyvalent metal hydroxide, there may be used any alkali metal hydroxide, that is to say, the hydroxide of any metal of Group IA of the Periodic Chart of the Elements (Merck and Co., Revised, 1955). It is preferred that the alkali metal hydroxide be sodium hydroxide, since this compound is widely available at low cost and also since most sodium salts tend to be quite insoluble in hydrocarbon liquids of the kind used in the process of this invention.

A substantial amount of water can be tolerated in the reaction mixture, without adverse effect upon the stability or the basicity of the product. In general, no rule can be stated regarding the maximum amount of water which can be present in the reaction zone without causing difficulties, but in general it is desirable that there be in the reaction zone no separate phase whose predominant component is water. It is preferred that the water content of the reaction mixture not exceed about 25% by weight.

The associates of the invention are most conveniently prepared by first preparing the solvent, whether it be a liquid hydrocarbon alone, or a composite solvent comprising the liquid hydrocarbon and the oxygen-containing organic liquid (and water, optionally), dissolving the carbocyclic acid compound in the solvent and then introducing near-molecular sized particles of polyvalent metal hydroxide into the reaction mixture. Introduction of the polyvalent metal hydroxide in the particles sizes required is effected in one of two ways: in the first, the polyvalent metal hydroxide is formed in situ in the reaction mixture by introducing the polyvalent metal ion and the hydroxyl ion separately into the reaction mixture, so that the molecules of polyvalent metal hydroxide are formed only in the reaction mixture. In the second method, the polyvalent metal hydroxide is formed outside the reaction mixture, but only under such conditions that when introduced into the reaction mixture, the hydroxide is in the form of particles not substantially greater than molecular in size.

The polyvalent metal hydroxide may be formed in situ in the reaction mixture by first adding the water-soluble polyvalent metal salt of the inorganic acid and then adding the alkali metal hydroxide, or the order of addition of these two reactants may be the reverse, or the two reactants may be added simultaneously. To insure that the polyvalent metal hydroxide is formed in near-molecular sized particles, it is preferred that the reactants be added slowly and with vigorous stirring to avoid local excesses of either reactant with consequent formation of particles substantially larger than near-molecular size.

When the polyvalent metal hydroxide is formed outside the reaction mixture, the methods used are the same as those set out above for forming the polyvalent metal salt in situ in the reaction mixture. It is essential to the successful preparation of the associates by this technique that the polyvalent metal hydroxide be thoroughly mixed with the reaction mixture as soon as possible after its formation.

In forming the polyvalent metal hydroxide, the water-soluble polyvalent metal salt of the inorganic acid and the alkali metal hydroxide may be used as such, but preferably are dissolved or suspended in water or in an oxygen-containing organic liquid, preferably the same oxygen-containing liquid as is present in the reaction zone. It is preferred that the concentration of these compounds in the solutions be from about 10% to about 60% by weight, and it is most desirable that the concentration of the compound lie within the range of from about 20% to about 40% by weight of the solution. When such solutions are used, due care must be taken to maintain the concentration of water and/or oxygen-containing-liquid in the reaction zone within the ranges heretofore set out.

In general, the associates of the invention are considerably less soluble in the solvents used in the process of the invention than are the starting materials, so that the associates tend to separate from the reaction medium. In most cases, the associate may be kept in solution by controlling the amount of the oxygen-containing organic liquid in the reaction medium.

A neutral to moderately basic polyvalent metal salt of the carbocyclic acid normally is used as the starting material. Such salts, and methods for preparing them are well-known in the art. Instead of the polyvalent metal salt, an alkali metal salt of the carbocyclic acid may be used, and converted in situ in the reaction mixture to the desired polyvalent metal salt. This may be accomplished by metathetic displacement of the alkali metal by the polyvalent metal of the inorganic acid used to form the free hydroxide—that is to say, the water-soluble inorganic polyvalent metal salt is added first, in an amount sufficient to effect replacement of all of the alkali metal, plus an amount sufficient to provide the desired amount of polyvalent metal ion in the final complex on addition of the alkali metal hydroxide, as will be set out hereinafter. The carbocyclic acid itself, or a partially neutralized acid product may be used, instead of the neutral or basic salt. When an acidic starting material is used, the most desirable procedure consists of neutralizing the acidic material with alkali metal hydroxide, and then metathetically converting the alkali metal salt to the polyvalent metal salt as set out above. Due allowance must be made in such a case for the amount of alkali metal hydroxide used to neutralize the acidic material.

The amounts of water-soluble inorganic polyvalent metal salt and alkali metal hydroxide added must be sufficient to provide in the reaction mixture a product containing the desired number of equivalents of polyvalent metal hydroxide per equivalent of the carbocyclic acid compound. Normally, it is desirable that the amounts of polyvalent metal salt and alkali metal hydroxide charged be such that the amount of polyvalent metal in the polyvalent metal hydroxide formed is somewhat in excess of the amount of the polyvalent metal in the polyvalent metal oxide desired in the final product, since in almost all cases, a minor amount of the formed hydroxide does not form the desired associate and is removed in later purification of the associate. Up to 15 equivalents or more of metal per equivalent of acid compound can be associated with one equivalent of the carbocyclic acid compound according to the process of the invention.

Recovery of a pure product is facilitated if the anion of the inorganic polyvalent metal salt and the cation of the alkali metal hydroxide are so chosen that the alkali metal salt formed by the reaction of the salt and the hydroxide is relatively insoluble in the reaction mixture. For this reason, it is preferred that the said anion be a halide ion, such as the chloride ion, and the said cation be the sodium ion.

Association of the carbocyclic acid compound with the polyvalent metal hydroxide can be effected at either ordinary room temperature, or at moderately elevated temperatures. Moderately elevated temperatures are especially suitable when using concentrated solutions of the carbocyclic acid compound starting material, since concentrated solutions of carbocyclic acids or metal salts of such acids often are quite viscous, and an increase in temperature normally results in a decrease in the viscosity of the solution. The temperatures employed in general should not be so high as to cause boiling of the solvent at the pressures used. Temperatures above about 150° C. should be avoided, and preferably temperatures greater than about 125° C. are not used, because of the possible adverse effect such temperatures may have on the product associate.

Although the reaction may be carried out at any pressure, including atmospheric pressure, it has been found most convenient to conduct the solubilization under slightly elevated pressures—e.g., up to about 1 atmosphere gauge.

Reaction time is not a critical factor in the process of the invention. In general a reaction time of at least ½ hour is required, but seldom is it necessary that the reaction time exceed about 4 to 5 hours. In most cases, a reaction time of from about ½ to about 2 hours will be found sufficient.

The associate of the polyvalent metal hydroxide with the polyvalent metal salt of the carbocyclic acid is converted to the associate of the corresponding polyvalent metal oxide by removing the oxygen-containing organic liquid and thereafter dehydrating the resulting mixture of hydroxide complex and liquid hydrocarbon until evolution of water (including any free water which may be present and the water formed by conversion of the polyvalent metal hydroxide to the corresponding polyvalent metal oxide) ceases.

The oxygen-containing organic liquid is most conveniently removed by simply heating the reaction mixture at such a temperature that the oxygen-containing liquid distills off, leaving the liquid hydrocarbon-hydroxide associate mixture. The liquid hydrocarbon and the pressure used should be such that the distillation can be carried out at a temperature below about 150° C. and preferably below about 125° C.

Dehydration of the reaction mixture, that is, removal of any free water and dehydration of the polyvalent metal hydroxide of the associate to the corresponding polyvalent metal oxide may be accomplished in several ways, depending upon the particular polyvalent metal salt of the carbocyclic acid and the particular polyvalent metal hydroxide involved. In some cases, the dehydration may be accomplished concurrently with the removal of the oxygen-containing organic material. In other cases, the oxygen-containing material is first removed and then the remaining mixture is heated to effect the dehydration. In still other cases, it will be found necessary to heat the mixture which has been freed of part or all of the oxygen-containing liquid under reflux for a period of time before water is permitted to escape the mixture. Surprisingly, it has been found that the presence of a small amount of added water in the reaction mixture during the dehydration in many cases considerably increases the oil solubility and weathering resistance of the product associates. The reason for this effect is not known with certainty. However, it is desirable that the reaction mixture contain at least about 1% by weight of water prior to the dehydration step. Preferably, the amount of water amounts to from about 2% to about 5% by weight of the reaction mixture. The presence of more than about 10% by weight of water in the reaction mixture will seldom be of substantial advantage.

In effecting the dehydration it is desirable that the temperature of the reaction mixture not exceed about 150° C., and preferably that the temperature not exceed about 125° C. The stability, oil-solubility and other characteristics of the associates may be undesirably affected if the reaction mixture is heated above about 150° C. Effective removal of the water from the reaction mixture under these temperature conditions is most conveniently accomplished by conducting the dehydration under suitably reduced pressures.

The product of this process comprises a solution of the associate in the liquid hydrocarbon together with solid inorganic salts. The solid salts are removed by filtration, centrifugation or like techniques for separating a solid from a liquid. The resulting solution of the associate may be used for fungicidal purposes directly, or it may be emulsified with water by adding thereto a suitable emulsifier, generally in an amount of from about 1% to about 10% by weight, and the quantity of water required for obtaining the concentration desired for the fungicidal application.

It is, however, preferred that the associate be obtained in the form of a powder, since in this form it may be used directly as a fungicide, or as a component of a fungicidal dust, wettable powder, or the like. The powdered form of the associate also is highly desirable from the standpoint of the transport and packaging—i.e., marketing—of the associate, since the powder is easily packaged and shipped without the requirement that the solvent also be packaged and shipped.

It is possible to obtain the associate as a powder from a solution of the associate in liquid hydrocarbon by evaporating the liquid hydrocarbon and powdering the resulting solid associate by mechanical methods. This method has certain drawbacks, however. It has been found that as the liquid hydrocarbon is evaporated, the associate tends to form a gel, which in many cases results in a substantial reduction in the solubility of the associate in liquid hydrocarbons such as oil fractions. Also, the stability and other characteristics of the associates are often adversely affected. Further, from the practical standpoint, evaporation of large amounts of solvent is undesirable and the suspension and/or gel of associate which results from evaporation of the solvent raises serious problems of heat transfer to effect removal of the solvent without causing deterioration of the product because of local high temperatures.

It has now been discovered that associates of polyvalent metal oxides with polyvalent metal salts of oil-soluble carbocyclic acids are easily and effectively recovered from solutions of these associates in liquid hydrocarbons by adding to the solutions a liquid which is miscible with the liquid hydrocarbon solvent and which has a dielectric constant of at least 6. When a solution of such an associate in a liquid hydrocarbon is treated in this manner, the associate separates from the solution as a finely divided solid. When this solid is dried, the associate is obtained as a fine powder, readily soluble in oil to form stable solutions, having high fungicidal activity and excellent weathering properties.

An organic liquid having a dielectric constant of at least 6 and which is at least partially miscible (preferably completely miscible) with the liquid hydrocarbon in which the associate is dissolved is used to precipitate the associate from the solution. Most suitable as the high-dielectric constant liquid, because of their ready availability and low cost are the oxygen-containing organic liquids mentioned hereinbefore as being an essential component of the reaction mixture in the preparation of the polyvalent metal hydroxide-polyvalent metal salt of the carbocyclic acid associates. Preferred are the lower aliphatic alcohols and ketones, such as the lower straight-chain and branched-chain alcohols, including methanol, ethanol, n- and isopropyl alcohols, n-, sec- and tert-butyl alcohols, and other alkanols containing up to about 6 carbon atoms per molecule, and the lower straight-chain and branched-chain aliphatic ketones, such as acetone, methyl isobutyl ketone, methyl ethyl ketone, methyl isopropyl ketone and other such ketones containing a total of up to about 6 carbon atoms per molecule.

The amount of the high-dielectric constant liquid used will be determined by the nature of the liquid hydrocarbon, the particular polyvalent metal involved and the particular residue of the carbocyclic acid involved. The amount of the high-dielectric constant liquid used must be of course at least sufficient to effect precipitation of substantially all of the associate from the liquid hydrocarbon solution. In the usual case, the amount of high dielectric constant liquid used will be about the same, on a weight basis, as the amount of the liquid hydrocarbon solution to be treated. In some cases, somewhat less than this amount may be required—a weight of high dielectric constant liquid amounting to about 25% by weight of the hydrocarbon solution is sometime quite sufficient—while in other cases an amount of high dielectric constant liquid amounting to as much as five times the weight of the hydrocarbon solution may be required. In the usual case, the amount of high dielectric constant liquid used preferably amounts to from about 75% to about 200% of the weight of hydrocarbon solution treated.

The associates prepared according to the invention may be used as such or they may be worked up into any type of fungicidal composition known in the art.

The new associates can be used alone or in combination with other fungicidal, virucidal insecticidal or acaricidal materials, the action of which may be either internal or external, with plant nutritives, with plant hormones, and the like. Wetting agents and, if necessary or desirable, stickers such as the heavy hydrocarbon oils with a minimum viscosity of 10° Engler at 50° C. can be present. Any conventional wetting agent, for example, alkyl sulfate salts, alkyl aryl sulfonate salts, sulfosuccinate salts, ethers from polyethylene glycols and alkylated phenols, and the like can be employed. If the toxic agents are employed in the form of emulsions or suspensions, for example, in water, solvents such as oils, emulsifiers, emulsion stabilizers, and the like can be added.

The new associates may be applied by means of spraying. Spraying preferably is performed with aqueous emulsions or suspensions of the active agents. Aqueous emulsions or suspensions containing from about 0.01 to about 1% by weight, and preferably from about 0.05 to about 0.5% by weight, of the active agent are particularly suitable. The spray liquid is generally applied at a rate of from about 75 to about 150 gallons per acre. If spraying is effected with much smaller quantities of liquid as in low volume spraying, higher concentrations of the active agents should be employed. If desired, a minor amount, of the order of from about 0.01 to about 0.05% by weight, of a wetting agent can be added to aid in forming a suspension of the active material in the aqueous medium. Any of the conventional wetting agents, such as those mentioned above, can be employed. Particularly suitable wetting agents are the sodium salt of a mixture of secondary heptadecyl sulfates, sold commercially under the name of "Teepol" and polyethylene glycol ethers of alkyl phenols sold under the trade name of "Triton X-100" and "Triton X-155." Concentrate compositions comprising one or more of the associates of the present invention and a suitable wetting agent may be prepared, and the concentrate is then dispersed in water just prior to use.

A further form in which the fungicidal compounds may be applied consists of solutions of the active ingredients in suitable inert liquid or semi-solid diluents in which the active ingredient is present in molecularly dispersed form. The form in which the agents to be employed are applied to the object treated depends on the nature of the object and the purpose of the application.

Suitable inert solvents for the manufacture of liquid preparations should not be readily inflammable, as odorless as possible and without any toxic effect on humans and animals when properly used. Neither should they have a corrosive effect on the components of the preparations of the material of the storage vessel. Examples of suitable solvents are high-boiling oils, e.g., oils of vegetable origin such as castor oil, etc., and lower-boiling solvents with a flash point of at least 30° C., such as carbon tetrachloride, ethylene dichloride, ethane tetrachloride, hydrated naphthalene, alkylated naphthalene, solvent naphtha, etc. Mixtures of solvents may, of course also be used.

The new associates can also be applied to plants in the form of dusts, utilizing as the inert vehicle such materials as tricalcium phosphate, precipitated chalk, bentonite kaolin, kieselguhr, etc., but cork powder, wood powder and the like may also be used. In these cases it is advisable to add wetting agents.

The active substances in question may also be used in the form of aerosols. For this purpose, the active ingredient must be dissolved or dispersed in a solvent boiling below room temperature at atmospheric pressure.

The invention is illustrated by the following examples which are not to be considered as limiting the invention in any manner.

EXAMPLE I

*Preparation of a copper oxide-copper salicylate associate.*—Phenol was alkylated with $C_{14}$–$C_{18}$ olefins (1½ to 2 olefin chains per mole of phenol). The alkylated phenol was then converted to the sodium alkyl phenolate and this was carboxylated according to the Kolbe-Schmitt Reaction (see Cameron, J. Org. Chem., 15, 233–236 (1950)) to give a mixture of approximately one part by weight of sodium alkyl salicylates and one part by weight of a mixture of sodium alkyl phenolates and olefin polymers. The mixture was acidified to convert the sodium alkyl salicylates to the corresponding alkyl salicylic acids and the alkyl phenols and olefin polymers were removed by extraction.

45.4 parts by weight of anhydrous copper chloride, in the form of a 20% by weight solution of copper chloride in methanol were gradually added over a period of one hour with stirring, to a solution of 25 parts by weight of the above-described alkyl salicylic acids in 330 parts by weight of xylene. At the same time, 27.0 parts by weight of sodium hydroxide in the form of a 4.26 N solution of sodium hydroxide in methanol were gradually added. The methanol was then distilled from the reaction mixture at atmospheric pressure. The insoluble copper hydroxide-copper salicylate associate present at the beginning of the removal of the methanol was gradually converted to the copper oxide-copper salicylate complex, which was soluble in the reaction mixture. The solution was filtered to remove the solid sodium chloride present. Further small quantities of methanol, water and a part of the xylene were distilled off under sufficient vacuum to permit this removal at about 100° C., and the solution again centrifuged to remove a small amount of solid material.

The xylene was then removed by distillation under vacuum to give a brown-black, brittle oil-soluble product which could be reduced to a very fine powder. The product contained 84% of the original amount of the alkyl salicylic acids and contained 42% by weight of copper. There were, thus, 10.48 atoms of copper as the oxide per atom of copper as the copper salt of the alkyl salicylic acids.

Recovery of a similar yield of an identical product from the xylene solution is effected by treating that solution with approximately an equal weight of methanol, centrifuging the resulting mixture to recover the solid associate and drying the associate in an oven at about 80° C.–100° C. The associate is obtained as a very fine powder.

EXAMPLE II

*Preparation of a copper oxide-copper naphthenate associate.*—87 parts by weight of anhydrous copper chloride, in the form of a 20% by weight solution of copper chloride in methanol, and 47.0 parts by weight of sodium hydroxide in the form of a 4.42 N solution of sodium hydroxide in methanol (15 equivalents of each per equivalent of acid) were simultaneously and gradually added over a period of 1½ hours, while stirring and at room temperature, to 25 parts by weight of distilled naphthenic acids having an acid number of 173 dissolved in 550 parts by weight of xylene. Most of the methanol was then distilled from the reaction mixture at atmospheric pressure. The insoluble copper hydroxide-copper naphthenate associate gradually was converted to the soluble copper oxide-copper naphthenate complex. Sodium chloride was removed by centrifuging the reaction mixture. The remainder of the alcohol, a small amount of water and a part of the xylene was then removed at 100° C. under vacuum and the mixture centrifuged to remove traces of solid material. Distillation of the xylene solvent under vacuum resulted in a black-brown product, easily reduced to a very fine powder and readily soluble in liquid hydrocarbons, which contained 99.8% of the original naphthenic acids, contained 52% by weight of copper and contained 13.62 atoms of copper as the oxide per atom of copper in the copper naphthenate.

The copper oxide-copper naphthenate associate may also be recovered from the xylene solution thereof by treating said solution with about 1.2 times the weight thereof of methanol, filtering off the precipitated associate and drying it. The final product of this method of recovery is a very fine powder.

EXAMPLE III

*Preparation of a zinc oxide-zinc naphthenate associate.*—5 parts by weight of distilled naphthenic acids having an acid number of 173 were dissolved in 87 parts by weight of xylene. Over a period of 1.5 hours, 16.22 parts by weight of zinc chloride (as a 20% by weight solution of zinc chloride in methanol) and 9.28 parts by weight of sodium hydroxide (as a 4.42 N solution of sodium hydroxide in methanol) were gradually and simultaneously added. Most of the methanol was then distilled off at atmospheric pressure, and the product worked up as indicated in Example II. After removal of the xylene by distillation under vacuum, a light yellow oil-soluble solid product was obtained which contained 98.3% of the original naphthenic acids, 53% by weight of zinc, and 14.1 atoms of zinc as zinc oxide per atom of zinc as zinc naphthenate.

The finely powdered associate is obtained directly from the xylene solution thereof by mixing that solution with an equal weight of methanol, filtering the resulting mixture and drying the solid thus obtained.

EXAMPLE IV

*Preparation of an iron oxide-iron salicylate associate.*—64 parts by weight of anhydrous ferric chloride, in the form of a 20% by weight solution in methanol were gradually added to a solution of 50 parts by weight of the alkyl salicylic acids described in Example I dissolved in 2000 parts by weight of xylene over a period of one hour at a temperature of 20° C., while stirring. 48 parts by weight of sodium hydroxide in the form of a 4.69 N solution of sodium hydroxide in methanol were added at the same time.

Approximately 1500 parts by weight of liquid were distilled off from this reaction mixture, at atmospheric pressure, followed by removal of a further 500 parts under vacuum, at about 115° C. The bottoms product was then centrifuged to give a dark red to purple solution. Distillation of the remaining xylene under vacuum resulted in a brown, brittle residue readily soluble in oil containing 93% of the original salicylic acids, 26.9% by weight of iron, and 9.0 atoms of iron as iron oxide per atom of iron as iron salicylate.

This product also results by treatment of the xylene solution of the associate with about one and one-half of its weight of methanol, recovery and drying of the solid.

EXAMPLE V

*Preparation of a copper oxide-copper sulfonate associate.*—22 parts by volume of a 5.2 N solution of sodium hydroxide in methanol and 39 parts by volume of a 25.2% by weight solution of cupric chloride dihydrate in methanol were added gradually and simultaneously, at room temperature, to a mixture of 50 parts by volume of methanol and 50 parts by volume of xylene. 100 parts by volume of a 5% by weight solution of naphtha sulfonic acids having an acid number of 129 were then immediately added at room temperature. The reaction mixture was stirred continuously.

Most of the methanol was then distilled off, 2% by volume of water was then added to the reaction mixture, and the mixture refluxed for 2 hours at atmospheric pressure. The insoluble material gradually passed into solution. The water was then distilled off, together with a part of the xylene, the sodium chloride was removed and the xylene distilled off under vacuum to give a product containing 99% of the original sulfonic acids and 98% of the copper. The product contained 38% by weight of copper and 4.5 atoms of copper as copper oxide per atom of copper as copper sulfonate. The product was readily soluble in liquid hydrocarbons.

Recovery of this associate also may be effected by treating the xylene solution thereof with about an equal weight of methanol, separating and drying the resulting solid associate.

EXAMPLE VI

*Preparation of a manganese dioxide-manganese naphthenate associate.*—44.35 parts by volume of a 5.2 N solution of sodium hydroxide in methanol and 71.2 parts by volume of a 20.4% by weight solution of anhydrous manganese dichloride in methanol were added gradually and simultaneously, at room temperature, to a mixture of 50 parts by volume of methanol and 50 parts by volume of xylene. 100 parts by volume of a 5% by weight solution of naphthenic acids having an acid number of 173 were then added at room temperature, while stirring continuously.

The stirring was continued for half an hour, after which the methanol was distilled off at atmospheric pressure. 5% by volume of water was then added, the mixture was refluxed for 1.5 hours at 120° C. the water and a part of the xylene were then distilled off and the sodium chloride removed. On evaporation of the xylene, a brown-black product soluble in liquid hydrocarbons was obtained, containing 100% of the original naphthenic acids and 98% of the manganese. The product contained 43% by weight manganese and 7.0 atoms of manganese as manganese dioxide per atom of manganese as manganese naphthenate.

Treatment of a xylene solution of a manganese dioxide-manganese naphthenate associate with about twice its weight of methanol precipitates the associate, which is recovered as a powder by filtering the solution and drying, the solid thus obtained.

EXAMPLE VII

*Preparation of a zinc oxide-copper naphthenate associate.*—The procedure of Example III is repeated, substituting for the naphthenic acids an equivalent amount of a neutral copper salt of the naphthenic acids and reducing the amount of zinc chloride used by an equivalent amount. The product is a zinc oxide-copper naphthenate associate.

EXAMPLE VIII

*Preparation of a copper oxide-copper naphthenate associate.*—Into a stainless steel stirred autoclave of 1000 liters capacity, fitted with an eccentric frame agitator, a distillation head and steam and cooling jackets were introduced: 20 kilograms of naphthenic acids having an acid value, (milliequivalents of potassium hydroxide per gram) of 179 and 220 kilograms of xylene. During a period of two hours, there were gradually added, separately and simultaneously, 172.2 kilograms of a 37.4% by weight solution of anhydrous copper chloride in methanol and 194 kilograms of a 19.8% by weight solution of sodium hydroxide in methanol. (15 equivalents of each reactant per equivalent of the naphthenic acids.) Care was taken to insure that there was always a small excess of copper chloride in the reaction mixture. The reaction temperature at the start was 16° C., at the end of the two-hour period was 27° C.

The methanol was then distilled off in the same apparatus at a maximum bottoms temperature of 120° C. without fractionation at atmospheric pressure. During the distillation, which took about 3 hours, some of the xylene passed overhead with the methanol. The total distillate amounted to 363 kilograms, of which about 100 kilograms was xylene. 100 kilograms of fresh xylene were then added to the bottoms product. In addition, 10 kilograms of water was added and the mixture was boiled while being stirred for an hour, the vapors being condensed and returned to the boiling mixture. The water was then azeotropically distilled from the mixture at a pressure of about 160 millimeters mercury pressure at a maximum bottoms temperature of about 100° C. Removal of the water required about two hours. The solid sodium chloride was removed by filtration of the reaction mixture in a filter press, precoated with 1 kilogram of Hyflo super-cel per square meter of surface. The rate of filtration was about 300 kilograms per hour per square meter of filter area.

2.5 kilograms of naphthenic acids (identical to those originally charged) were added to the filtrate (275 kilograms) to aid in the separation of the associate and 320 kilograms of methanol were added. The mixture was maintained at room temperature, and constantly stirred during addition of the methanol. The associate settled rapidly from the solution. The mixture was filtered in a Buchner funnel and the solid matter dried at a pressure of about 160 millimeters of mercury pressure and 100° for 24 hours. There was obtained 45.2 kilograms of a powdered solid associate of copper oxide with copper naphthenate readily completely soluble in oil and containing 56% by weight of copper.

The utility of the associates of the invention as improved fungicides is demonstrated by the following examples:

EXAMPLE IX

Representative members of the new associates were tested to determine their fungicidal effect on *Phytophthora infestans* (late potato blight) on potatoes and tomatoes. The amount of copper which must be sprayed per square meter of planted area to obtain a control of the fungus of 70% was determined. For comparison, copper oxychloride, a widely used fungicide, was tested, in the form of a suspension of a wettable powder. Neutral copper naphthenate (prepared from naphthenic acids having an acid number of 173) was also tested. The results of these tests, which were on a green-house scale, is set out in Table I. In Table I, the term "emulsible oil" designates a composition in which the copper compound is dissolved in a liquid hydrocarbon or a mixture of liquid hydrocarbons, after which this solution is emulsified in water, the term "Vapona" designates a concentrated solution of the copper compound in a liquid hydrocarbon or a mixture of liquid hydrocarbons, diluted with a mixture consisting of 1 part of white oil and 9 parts of kerosene. When 100 to 1000 milliliters of fungicidal composition are sprayed per square meter of planted area, this is referred to as high-volume spraying; when 10 milliliters or less of fungicidal composition are sprayed per square meter, this is referred to as low-volume spraying.

Table I

| Test Material | Form of Composition | Amount of composition used per square meter (milliliters) | Grams of copper per square meter required for 70% control of fungus | Copper activity |
|---|---|---|---|---|
| Associate of Example I. | Emulsible oil | 1,000 | 0.030 | 830 |
| (same) | Vapona | 10 | 0.037 | 700 |
| Associate of Example II. | do | 10 | 0.037 | 700 |
| Neutral copper naphthenate. | Emulsible oil | 100 | 0.037 | 700 |
| Do | do | 10 | 0.060 | 625 |
| Copper oxychloride. | Suspension of wettable powder. | 100 | 0.250 | 100 |

It will be noted that these test results show that the fungicidal activity of the copper in the new associates is some 7 to 8 times the activity of the copper in the widely used fungicide, copper oxychloride. Further, these results show that the activity of the copper in the new associates is at least as great as the activity of the copper in neutral copper naphthenate, but that the organic acid content of the new associates is but about 10% of that of the neutral naphthenate. The new associates thus provide a very high level of fungitoxicity at very low concentrations of the active material. These facts, together with the ready solubility of the associates in liquid hydrocarbons, the stability of these solutions, and the stability—i.e., resistance to weathering—of the associates, make these associates very promising candidate fungicides.

EXAMPLE X

The representative associate prepared according to Example VII was tested against late blight on potatoes and tomatoes. Three types of formulations were tested. The results, expressed as "relative degree of suppression," are given in Table II. The relative degree of suppression is defined as $$\frac{\text{degree of suppression obtained with the copper oxide-copper naphthenate associate of Example VII}}{\text{degree of suppression obtained with neutral copper naphthenate}} \times 100$$

The degree of suppression was determined as follows:

Some time, for example 1 to 2 weeks, after the substance to be tested had been applied to the plants being treated, the ratio of the area of leaf surface damaged by the disease to the total area of leaf surface was determined in the case of treated and untreated infected plants. By subtracting the quotient of these two numbers from 1, a figure is obtained, which is a measure of the suppression of the pathogenic agent. Expressed as a percentage, this figure is called the degree of suppression. The time at which this degree of suppression, as defined above, was determined was so selected on each occasion that all the infected untreated plants showed distinct symptoms of the disease.

As a rule the leaf area was not measured but was estimated as accurately as possible. In this way an experienced worker can determine the degree of suppression to a degree of accuracy of about 5%. This degree of accuracy is sufficient, because in general the results achieved in biological experiments are only reproducible within wide limits.

Table II

| Formulation | Relative degree of suppression | | | |
|---|---|---|---|---|
| | Tomatoes | | Potatoes | |
| | No rain | After 60 mm. of rain | No rain | After 60 mm. of rain |
| Vapona | 140 | 126 | 175 | 150 |
| Wettable powder | 119 | 106 | 122 | 109 |
| Emulsion | 135 | 130 | 148 | 139 |
| Neutral copper naphthenate | 100 | 60 | 100 | 63 |

These results demonstrate the high fungicidal activity of the new associates and the resistance of these associates to weathering and the superiority of the new associates in this respect as compared to the neutral naphthenate.

EXAMPLE XI

The copper oxide-copper naphthenate associate of Example VII was tested on a field scale for the control of late blight on potatoes. The associate was applied as a wettable powder comprising 92.5% by weight of the associate and 7.5% by weight of a wetting agent, mixed with water. This composition was applied at the rate of 1 kilogram of associate per half-acre of planted area. For comparison, another plot was treated with Zineb, zinc ethylene bis-dithiocarbamate, a widely used fungicide, at the rate of 2.3 kilograms of Zineb per half-acre of planted area and another plot was treated with a commercial fungicide containing 50% by weight of copper as copper oxychloride, at the rate of 5.9 kilograms of the fungicide per half-acre of planted area. All of the tests were carried out on normal farm crops and spray applications were made with machines in normal farm use. The weather was dry.

The degree of blight infection on the plants was made by foliage lesion counts from a standard number of stems per plot. The total weight of tubers from each of the test plots was also noted. The following results were obtained:

Table III

| Active test material | Dosage (kilograms of active material per half-acre of planted area) | Percent control of blight |
|---|---|---|
| Copper oxide-copper naphthenate associate | 1 | 84 |
| Zineb | 2.3 | 84 |
| Copper oxychloride | 5.9 | 74 |
| None | 0 | 0 |

These test results show that the associate, at 1 kilogram per half-acre, gave the same control as 2.3 kilograms of Zineb per half-acre and better control than 5.9 kilograms of copper oxychloride per half-acre.

EXAMPLE XII

A copper oxide-copper naphthenate complex prepared according to the procedure set out in Example II, and containing 14 atoms of copper as the oxide, per atom of copper as the naphthenate, was compared to neutral copper naphthenate for the protection of potatoes against late blight. The active agents were each applied as a 20% by weight solution in horticultural oil. A dosage of 1 kilogram per half-acre of planted area of the composition containing the associate gave complete control of the fungus; 15 to 20 times this dosage of the neutral naphthenate salt was required.

We claim as our invention:

1. A process for the preparation of oil-soluble associates of oxides of polyvalent metals and salts of carbocyclic acids with polyvalent metals, which process comprises mixing, and thereby effecting reaction between, two materials only, one an oil-soluble carbocyclic acid compound containing at least 12 carbon atoms of the group consisting of oil-soluble carbocyclic acids, oil-soluble salts of such acids and alkali metals, and oil-soluble salts of such acids and polyvalent metals having atomic numbers of from 23 through 30, inclusive, and the other a hydroxide of a polyvalent metal having an atomic number of from 23 through 30, inclusive, said hydroxide being in the form of a finely divided solid, the said mixing of said two materials being effected in the presence of a liquid reaction medium consisting essentially of at least 20% by weight of a non-acidic oxygen-containing organic liquid boiling below about 140° C. and substantially miscible with water, at least 20% by weight of a low-viscosity, liquid hydrocarbon boiling below about 250° C. and substantially miscible with said oxygen-containing organic liquid, and from 0% up to the amount completely miscible with said oxygen-containing organic liquid of water, thereafter removing said oxygen-containing organic liquid and dehydrating the resulting mixture, to give as product a solution of an oil-soluble associate of an oxide of the polyvalent metal with a polyvalent metal salt of the carbocyclic acid in said liquid hydrocarbon.

2. A process for the preparation of oil-soluble associates of oxides of polyvalent metals and salts of carbocyclic acids with polyvalent metals which comprises mixing, and thereby effecting reaction between, two materials only, one an oil-soluble carbocyclic acid compound containing at least 12 carbon atoms of the group consisting of oil-soluble carbocyclic acids, oil-soluble salts of such acids and alkali metals, and oil-soluble salts of such acids and polyvalent metals having atomic numbers of from 23 to 30, inclusive, and the other a hydroxide of a polyvalent metal having an atomic number of from 23 through 30, inclusive, said hydroxide being formed only in situ in the presence of the carbocyclic acid compound and in the presence of a liquid reaction medium consisting essentially of at least 20% by weight of an aliphatic, non-acidic, oxygen-containing organic liquid boiling below about 140° C. and substantially miscible with water, at least 20% by weight of a low-viscosity liquid hydrocarbon boiling below about 250° C. and substantially miscible with said oxygen-containing organic liquid, and from 0% up to the amount completely miscible with said oxygen-containing organic liquid of water, thereafter removing said oxygen-containing organic liquid and dehydrating the resulting mixture, to give as product a solution of an oil-soluble associate of an oxide of the polyvalent metal with a polyvalent metal salt of the carbocyclic acid in said liquid hydrocarbon.

3. The process of claim 2 wherein the said polyvalent metal hydroxide is formed by mixing, and thereby effecting reaction between a water-soluble salt of an inorganic acid and a polyvalent metal having an atomic number of from 23 through 30, inclusive, and an alkali metal hydroxide.

4. A process for the preparation of oil-soluble associates of oxides of polyvalent metals and salts of carbocyclic acids with polyvalent metals, which process comprises mixing, and thereby effecting reaction between, two materials only, one an oil-soluble carbocyclic acid compound containing at least 12 carbon atoms of the group consisting of oil-soluble carbocyclic acids, oil-soluble salts of such acids and alkali metals, and oil soluble salts of such acids and polyvalent metals having atomic numbers of from 23 through 30, inclusive, and the other a hydroxide of a polyvalent metal having an atomic number of from 23 through 30, inclusive, said hydroxide being in the form of a finely divided solid, the said mixing of said two materials being effected in the presence of a homogeneous liquid reaction medium consisting essentially of at least 20% by weight of a non-acidic oxygen-containing organic liquid boiling below about 140° C. and substantially miscible with water, at least 20% by weight of a low-viscosity, liquid hydrocarbon boiling below about 250° C. and substantially miscible with said oxygen-containing organic liquid, and optionally water, thereafter removing said oxygen-containing organic liquid, dehydrating the resulting mixture, removing any solid materials present therein, mixing the resulting solution with an organic liquid having a dielectric constant of at least 6, and recovering from the resulting mixture a solid associate of an oxide of the polyvalent metal with a polyvalent metal salt of the carbocyclic acid.

5. A process for the preparation of oil-soluble associates of oxides of polyvalent metals and salts of carbocyclic acids with polyvalent metals which comprises mixing, and thereby effecting reaction between, two materials only, one an oil-soluble carbocyclic acid compound containing at least 12 carbon atoms of the group consisting of oil-soluble carbocyclic acids, oil-soluble salts of such acids and alkali metals, and oil-soluble salts of such acids and polyvalent metals having atomic numbers of from 23 to 30, inclusive, and the other a hydroxide of a polyvalent metal having an atomic number of from 23 through 30, inclusive, said hydroxide being formed only in situ in the presence of the carbocyclic acid compound and in the presence of a homogeneous liquid reaction medium consisting essentially of at least 20% by weight of a non-acidic oxygen-containing organic liquid boiling below about 140° C. and substantially miscible with water, at least 20% by weight of a low-viscosity, liquid hydrocarbon boiling below about 250° C. and substantially miscible with said oxygen-containing organic liquid, and optionally water, thereafter removing said oxygen-containing organic liquid, dehydrating the resulting mixture, removing any solid materials present therein, mixing the resulting solution with an organic liquid having a dielectric constant of at least 6, and recovering from the resulting mixture a solid associate of an oxide of the polyvalent metal with a polyvalent metal salt of the carbocyclic acid.

6. The process of claim 5 wherein the said polyvalent metal hydroxide is formed by mixing, and thereby effecting reaction between a water-soluble salt of an inorganic acid and a polyvalent metal having an atomic number of from 23 through 30, inclusive, and an alkali metal hydroxide.

7. The process of claim 6 wherein the water-soluble salt of the inorganic acid and the polyvalent metal is a polyvalent metal halide.

8. The associate prepared according to claim 4.

9. The associate prepared according to claim 7.

10. An oil-soluble associate of an oxide of a polyvalent metal having an atomic number of from 23 through 30, inclusive, and a salt of an oil-soluble carbocyclic acid containing at least 12 carbon atoms and a polyvalent metal having an atomic number of from 23 through 30, inclusive, said oxide and said salt being the only components of said associate.

11. The associate according to claim 10 wherein there is at least five atoms of metal present as the oxide per atom of the metal present in the salt of the carbocyclic acid.

12. The associate of claim 11 in which the polyvalent metal of the oxide and the polyvalent metal of the salt of the carbocyclic acid are the same and are copper.

13. A process for recovering an oil-soluble associate of an oxide of a polyvalent metal and a polyvalent metal salt of an oil-soluble carbocyclic acid containing at least 12 carbon atoms, said polyvalent metals having atomic numbers of from 23 through 30, inclusive, said oxide and said salt being the only components of said associate, from a solution of said associate in a liquid hydrocarbon comprising mixing said solution with a non-acidic, oxygen-containing organic liquid boiling below about 140° C. and substantially miscible with water, in an amount sufficient to precipitate a substantial amount of the said associate, and separating the solid precipitated associate from the liquid phase.

14. A process for recovering an oil-soluble associate of an oxide of a polyvalent metal and a polyvalent metal salt of an oil-soluble carbocyclic acid containing at least 12 carbon atoms, said polyvalent metals having atomic numbers of from 23 through 30, inclusive, said oxide and said salt being the only components of said associate, from a solution of said associate in a liquid hydrocarbon comprising mixing said solution with at least about 25% of the weight of said solution of a non-acidic, oxygen-containing organic liquid boiling below about 140° C. and substantially miscible with water, whereby a substantial amount of the said associate is precipitated, and separating the solid precipitated associate from the liquid phase.

15. A process for recovering an oil-soluble associate of an oxide of a polyvalent metal and a polyvalent metal salt of an oil-soluble carbocyclic acid containing at least 12 carbon atoms, said polyvalent metals having atomic numbers of from 23 through 30, inclusive, said oxide and said salt being the only components of said associate, from a solution of said associate in a liquid hydrocarbon comprising mixing said solution with from about 75% to about 200% of the weight of said solution of a lower aliphatic alcohol whereby a substantial amount of the said associate is precipitated, and separating the solid precipitated associate from the liquid phase.

16. The method of destroying fungi which comprises contacting said fungi with at least one associate of an oxide of a polyvalent metal having an atomic number of from 23 through 30, inclusive, and a salt of an oil-soluble carbocyclic acid containing at least 12 carbon atoms and a polyvalent metal having an atomic number of from 23 through 30, inclusive, said oxide and said salt being the only components of said associate.

17. The method of claim 15 in which the said associate contains at least 5 atoms of polyvalent metal as the oxide per atom of polyvalent metal in the salt of the carbocyclic acid.

18. The method of claim 16 wherein the polyvalent metal of the oxide and the polyvalent metal of the salt of the carbocyclic acid are the same and are copper.

19. A fungicidal composition comprising at least one associate of an oxide of a polyvalent metal having an atomic number of from 23 through 30, inclusive, and a salt of an oil-soluble carbocyclic acid containing at least 12 carbon atoms and a polyvalent metal having an atomic number of from 23 through 30, inclusive, said oxide and said salt being the only components of said associate, and a solvent as fungicidal adjuvant therefor.

20. A fungicidal composition comprising at least one associate of an oxide of a polyvalent metal having an atomic number of from 23 through 30, inclusive, and a salt of an oil-soluble carbocyclic acid containing at least 12 carbon atoms and a polyvalent metal having an atomic number of from 23 through 30, inclusive, said oxide and said salt being the only components of said associate, and an emulsifying agent suitable for dispersing the composition in an aqueous medium.

References Cited in the file of this patent

UNITED STATES PATENTS

| | | |
|---|---|---|
| 1,986,044 | Casaburi | Jan. 1, 1935 |
| 2,150,349 | Van Peski et al. | Mar. 14, 1939 |
| 2,371,483 | Tuwiner et al. | Mar. 13, 1945 |